(No Model.)
J. J. FETZER.
RUNNING GEAR FOR VEHICLES.
No. 436,344. Patented Sept. 16, 1890.
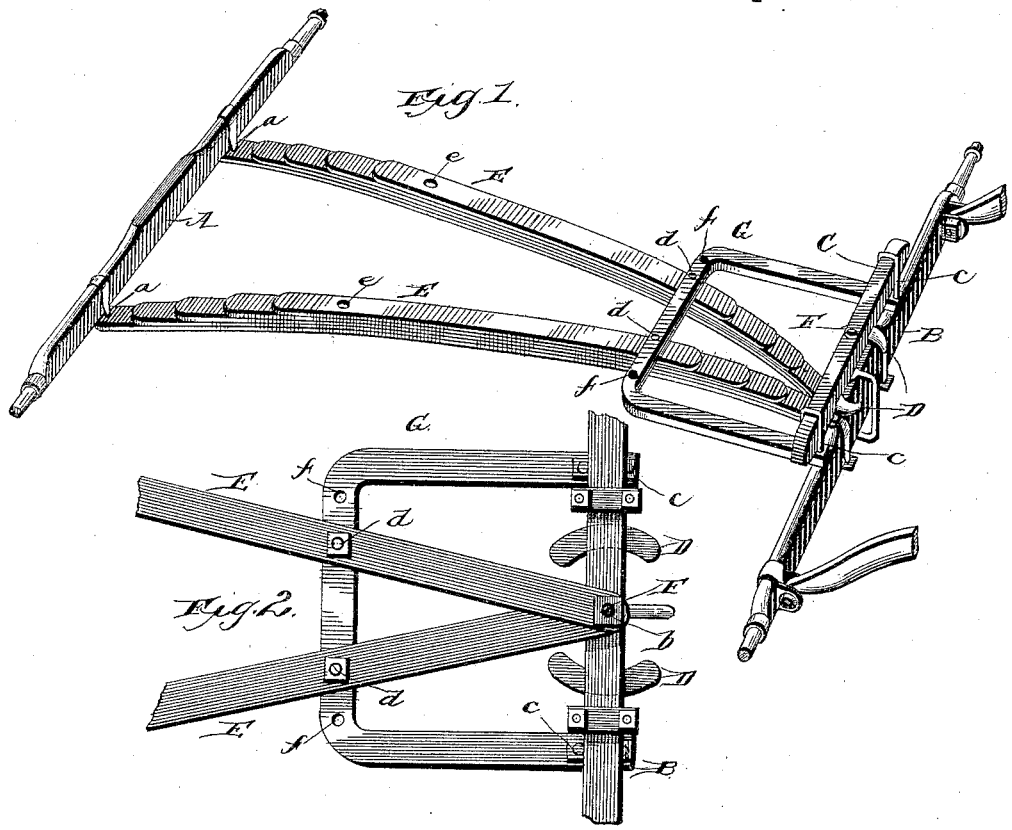

UNITED STATES PATENT OFFICE.

JAMES J. FETZER, OF COLUMBIANA, OHIO.

RUNNING-GEAR FOR VEHICLES.

SPECIFICATION forming part of Letters Patent No. 436,344, dated September 16, 1890.

Application filed January 9, 1890. Serial No. 336,458. (No model.)

*To all whom it may concern:*

Be it known that I, JAMES J. FETZER, a citizen of the United States, residing at Columbiana, in the county of Columbiana and State of Ohio, have invented certain new and useful Improvements in Running-Gear for Vehicles; and I do hereby declare the following to be a full, clear, and exact description of the invention, such as will enable others skilled in the art to which it appertains to make and use the same.

My invention relates to running-gear for vehicles, and has for its object an improved construction whereby material is economized and increased efficiency of action and durability are promoted.

The invention will be hereinafter described, and particularly pointed out in the claim.

In the accompanying drawings, which form part of this specification, Figure 1 is a perspective of my invention, and Fig. 2 an inverted plan view.

Reference being had to the drawings and the letters thereon, A indicates the rear axle, B the front axle, C the bolster, and D the fifth-wheel, all of which may be of any approved construction.

The springs E E are clipped to the rear axle A at $a\ a$ on opposite sides of the center thereof, and extend forward to the front axle B at an angle and form a junction at the center of said axle, and are secured by the king-bolt F, which passes through both of the springs, and a nut $b$.

G indicates a metallic brace, which is secured at its ends to the bolster C by means of clips $c\ c$, extends rearward and crosses the springs E E, and is secured thereto by bolts $d\ d$ for the purpose of adding stiffness and rigidity to the structure and for forming additional support for the body of the vehicle.

The body of the vehicle is secured to the running-gear by bolts passing through the body and through the apertures $e\ e$ in the springs and $f\ f$ in the brace.

By the construction shown a reach is dispensed with and the front and rear axles connected by the angularly-arranged springs, which directly support the body of the vehicle, the number of parts reduced to the minimum, and a very light and easy-riding running-gear produced.

Having thus fully described my invention, what I claim is—

A running-gear for vehicles, having two converging springs secured directly to the rear axle on opposite sides of its center by clips and at their front end by a single bolt passing through both springs, in combination with a metallic brace secured at its ends to the bolster, extending rearwardly, crossing the springs transversely, and secured thereto, substantially as described.

In testimony whereof I affix my signature in presence of two witnesses.

JAMES J. FETZER.

Witnesses:
ALEX. S. H. JOHNSTON,
JOHN G. BEATTY.